(12) United States Patent
Philipps et al.

(10) Patent No.: US 10,139,497 B2
(45) Date of Patent: Nov. 27, 2018

(54) DEVICE AND METHOD FOR READING AN IMAGING PLATE

(71) Applicant: Dürr Dental AG, Bietigheim-Bissingen (DE)

(72) Inventors: Bernd Philipps, Untergruppenbach (DE); Michael Weber, Burgstetten (DE); Alexander Hack, Biberach (DE)

(73) Assignee: Dürr Dental AG, Bietigheim-Bissingen (DE)

( * ) Notice: Subject to any disclaimer, the term of this patent is extended or adjusted under 35 U.S.C. 154(b) by 415 days.

(21) Appl. No.: 14/283,994

(22) Filed: May 21, 2014

(65) Prior Publication Data

US 2014/0252252 A1    Sep. 11, 2014

Related U.S. Application Data

(63) Continuation of application No. PCT/EP2012/004017, filed on Sep. 26, 2012.

(30) Foreign Application Priority Data

Nov. 22, 2011    (DE) .......................... 10 2011 119 049

(51) Int. Cl.
*G01N 1/00* (2006.01)
*G01T 1/20* (2006.01)
(Continued)

(52) U.S. Cl.
CPC .......... *G01T 1/2014* (2013.01); *G01T 1/2016* (2013.01); *G02B 26/101* (2013.01); *G02B 27/026* (2013.01); *G03B 42/08* (2013.01)

(58) Field of Classification Search
CPC ... G01T 1/2992; G01T 1/2012; G01T 1/2014; G01T 1/2016; G03B 42/02; G03B 42/08;
(Continued)

(56) References Cited

U.S. PATENT DOCUMENTS 4,750,045 A    6/1988  Ohara et al.
4,851,679 A *  7/1989  Tamura et al. ............... 250/588
(Continued)

FOREIGN PATENT DOCUMENTS

CN    101261425 A    9/2008
CN    101317130 A    12/2008
(Continued)

OTHER PUBLICATIONS

International Search Report cited in PCT/EP2012/004017, dated Mar. 26, 2013.
(Continued)

*Primary Examiner* — David Porta
*Assistant Examiner* — Mamadou Faye
(74) *Attorney, Agent, or Firm* — Lempia Summerfield Katz LLC

(57) ABSTRACT

A device configured to read an exposed imaging plate, comprises a light-source that generates read-out light. A deflection unit directs the read-out light in a scanning movement over the imaging plate. The deflection unit comprises a micromirror that deflects impinging read-out light towards the imaging plate. The micromirror swivels about a first swivel axis and about a different second swivel axis. The micromirror oscillates with a first frequency about the first swivel axis and simultaneously with a different second frequency about the second swivel axis. A detector unit detects fluorescent light which is emitted from the imaging plate at locations where the read-out light impinges.

26 Claims, 7 Drawing Sheets

(51) Int. Cl.
*G03B 42/08* (2006.01)
*G02B 26/10* (2006.01)
*G02B 27/02* (2006.01)

(58) Field of Classification Search
CPC ........ G03B 42/045; G03B 42/04; G21K 4/00; H04N 1/0281
See application file for complete search history.

(56) References Cited

U.S. PATENT DOCUMENTS

| | | | | |
|---|---|---|---|---|
| 4,922,103 | A | * | 5/1990 | Kawajiri et al. ............... 250/586 |
| 5,371,377 | A | * | 12/1994 | Struye et al. ................. 250/588 |
| 5,691,535 | A | * | 11/1997 | Boutet ........................... 250/234 |
| 5,969,652 | A | * | 10/1999 | Iwakiri .................. H04N 1/401 341/118 |
| 6,343,787 | B1 | * | 2/2002 | Kato ...................... B65H 5/064 271/274 |
| 6,696,698 | B2 | * | 2/2004 | Livingston .................... 250/584 |
| 6,911,647 | B2 | * | 6/2005 | Urbon et al. ................. 250/234 |
| 2002/0024708 | A1 | * | 2/2002 | Lewis et al. .................. 359/197 |
| 2003/0179415 | A1 | * | 9/2003 | Yasuda .......................... 358/302 |
| 2004/0256921 | A1 | | 12/2004 | Turner et al. |
| 2005/0178629 | A1 | * | 8/2005 | Ohtsuka ........................ 188/380 |
| 2007/0041077 | A1 | * | 2/2007 | Seo et al. ...................... 359/291 |
| 2009/0023999 | A1 | * | 1/2009 | Mathieu et al. .............. 600/160 |
| 2009/0078874 | A1 | * | 3/2009 | Schweizer et al. ...... 250/363.02 |
| 2009/0153932 | A1 | * | 6/2009 | Davis ................. G02B 23/2423 359/199.2 |
| 2013/0016321 | A1 | * | 1/2013 | Duelli et al. .................... 353/20 |

FOREIGN PATENT DOCUMENTS

| | | |
|---|---|---|
| CN | 101317131 A | 12/2008 |
| CN | 101387752 A | 3/2009 |
| EP | 0304060 | 2/1989 |
| EP | 0446384 | 9/1991 |
| JP | 01-253724 * | 10/1989 |
| JP | 2008209466 A | 2/2007 |
| JP | 2008-209466 A * | 9/2008 |
| JP | 2008209466 | 9/2008 |

OTHER PUBLICATIONS

Chinese office Action for related Chinese Application No. 201280057335.6 dated Nov. 19, 2015, with English Translation.

* cited by examiner

DEVICE AND METHOD FOR READING AN IMAGING PLATE

CROSS-REFERENCE TO RELATED APPLICATIONS

This is a continuation application of International Patent Application PCT/EP2012/004017, which was filed on Sep. 26, 2012 and claims benefit of German patent application Ser. No. 102011119049.3 filed Nov. 22, 2011. The full disclosure of these earlier applications is incorporated herein by reference.

BACKGROUND OF THE INVENTION

1. Field of the Invention

The invention relates to a device and a method for reading an exposed imaging plate.

2. Description of Related Art

In X-ray technology, particularly in dental X-ray technology, imaging plates are used nowadays for the purpose of recording X-ray images. These imaging plates include a phosphor material which has been embedded in a transparent matrix. As a result, so-called storage centres arise, which can be brought into excited metastable states by incident X-ray light. If such an imaging plate is exposed in an X-ray apparatus, for example for the purpose of recording the dentition of a patient, the imaging plate contains a latent X-ray image in the form of excited and non-excited storage centres.

For the purpose of reading the imaging plates, the latter are scanned with read-out light, point by point, in a scanner, as a result of which the metastable states of the excited storage centres are brought into a state that relaxes rapidly, emitting fluorescent light. This fluorescent light can be registered with the aid of a detector unit, so that the X-ray image can be made visible with appropriate evaluating electronics.

Conventional scanners, such as a drum scanner for example, conduct the imaging plate along a cylindrical surface across a read-out gap. In the interior of the cylindrical surface a rotary mirror has been provided by way of deflection unit, which generates a circumferential read-out beam. The latter falls through the read-out gap onto the imaging plate and reads the latter in pointwise manner. Meanwhile the imaging plate is conducted past the read-out gap by a mechanical drive, so that the entire surface of the imaging plate is registered.

With such a drum scanner, particularly in the dental field in which mostly small-format imaging plates come into operation, it is disadvantageous that the imaging plate has been arranged only along a small region of the periphery of the cylinder. For a large proportion of the read-out time the read-out beam therefore circulates within a region where no imaging plate is present, so that, on average, the read-out beam actually impinges on the imaging plate only during approximately 10% of the read-out time. This results in unnecessarily long read-out times.

SUMMARY OF THE INVENTION

It is therefore an object of the invention to provide a device and a method with which the read-out efficiency has been improved.

With regard to the device, this object is achieved by a device that is configured to read an exposed imaging plate, comprises a light-source that generates read-out light. A deflection unit directs the read-out light in a scanning movement over the imaging plate. The deflection unit comprises a micromirror that deflects impinging read-out light towards the imaging plate. The micromirror swivels about a first swivel axis and about a different second swivel axis. The micromirror oscillates with a first frequency about the first swivel axis and simultaneously with a different second frequency about the second swivel axis. A detector unit detects fluorescent light which is emitted from the imaging plate at locations where the read-out light impinges.

It has been recognised that with a controllable mirror that is capable of being swivelled back and forth, the read-out light can be guided in such a way that most of the time it falls onto the imaging plate. As a result, the time that is needed overall for reading an imaging plate is reduced.

The micromirror may, in particular, take the form of a MEMS micromirror (MEMS: microelectromechanical system). Characteristic of MEMS technology is the integration of mechanical elements, actuators and electronics on a common substrate, with manufacture being undertaken in a manner similar to that in the case of processors and memory chips, and including the application of layers of material and subsequent selective etching. MEMS micromirrors are very reliable and, by reason of their low mass, react very quickly to drive signals, so that high deflection speeds can be obtained.

By virtue of a deflection about two axes, a two-dimensional imaging plate can be scanned even without relative motion between the deflection unit and the imaging plate. The two axes in this case have preferentially been arranged parallel to the edges of the mostly rectangular imaging plate.

In one embodiment, the mirror is capable of being swivelled about the two swivel axes continuously between two end positions. By virtue of a continuous swivelling capacity along the swivel axes, the micromirror is able to scan an uninterrupted scan line on the imaging plate.

A MEMS micromirror is usually provided with a cardanic suspension, the suspension points of which take the form of solid joints. As a result, the micromirror with the solid joints forms a system capable of oscillating, which exhibits a natural frequency for each degree of freedom. If the micromirror is driven at, or close to, natural frequency, then oscillation amplitudes are obtained that are as large as possible with as little expenditure of energy as possible.

The mirror may have different natural frequencies about the two swivel axes. In this way, differing oscillation frequencies in differing scanning directions can be obtained with low expenditure of energy.

A predetermined pattern may be scanned on the imaging plate with the read-out light, whereby the pattern may cover the entire imaging plate with uniform density. By virtue of a uniform density in the course of the scanning of the imaging plate, the signal-to-noise ratio and the resolution of the X-ray image that has been read are approximately constant over the entire imaging plate.

If a control unit drives the mirror in such a way that a Lissajous figure or curve on the imaging plate is scanned with the read-out light, then a complete scanning of the entire imaging plate may be obtained. In particular, the micromirror and the imaging plate in this case may have been arranged relative to one another in such a way that the Lissajous figure or curve extends beyond the edges of the imaging plate. The part of the pattern projecting beyond one of the edges preferentially corresponds to between 5% and 15% of the dimension of the imaging plate perpendicular to this edge.

In the case of the Lissajous figures or curves the control unit may be able to drive the mirror about the two swivel axes at frequencies that correspond to a large, preferentially variable, preferentially integral, multiple of a base frequency, in particular to 0.5 times the desired number of lines or the number of columns of the image, and/or that differ slightly from one another from such an integral multiple, in particular by approximately 10% of the lower frequency. The slight difference may also amount to only approximately 2% of the lower frequency.

For example, frequencies of 30 Hz and 40 Hz may be used, in which case the base frequency would then be 10 Hz, and a ratio of 3:4 results. If the two frequencies or frequency multiples of the Lissajous figure or curve differ slightly, then a moving Lissajous figure or curve is scanned. 'Moving' here means a Lissajous figure or curve changing in a manner similar to a beat. As a result, the entire imaging plate can be scanned.

Another method for scanning the entire imaging plate consists in using frequencies being large integral multiples of one another, in particular 0.5 times the desired number of lines or number of columns of the image. 'Large' in this connection means, in particular, that the two frequencies at which the mirror is driven differ by more than a factor of more than 250, preferentially more than 500.

An evaluating unit may be connected to the detector unit, which in the course of evaluating takes account of the fact that, by virtue of the oscillatory motion of the mirror, various points of the imaging plate are scanned variably often and/or for variably long times, in particular by means of a position dependent correction factor.

In the course of the scanning of Lissajous figures or curves and some other patterns, some points are scanned repeatedly, and other points once only. As a result, storage centres that have remained in the excited state are read out additionally in the course of the later scanning. The diminution, increasing after each further scanning of a point, of the excited storage centres can, for example, be taken into account by a weighted averaging. However, the variable scanning of various points may result in a locally variable signal-to-noise ratio. For this reason, the evaluating unit may, in the course of evaluating, have recourse to a correction table that was created on the basis of calibration measurements.

The Lissajous figures or curves can be simulated mathematically, and the registered intensities can be corrected accordingly. Better, however, is a calibration on the basis of calibrating imaging plates, for example a uniformly exposed imaging plate. Once this has been read, the intensities obtained are converted into correction values which are saved in the correction table.

The device may include a sync detector, preferentially a photodiode, with which the read-out light can be detected at a predetermined scanning location in order to synchronise the evaluating unit with the motion of the mirror. In this way, the registration of the detector signal can be synchronised by the evaluating unit, as needed, with the scanning motion of the read-out light beam.

A control unit may be provided, with which periodic pulses can be generated which excite the mirror to oscillate. In this connection the periodicity, the pulse width, the pulse shape and/or the pulse height may be variable, in order to influence the excited oscillation amplitude and/or oscillation frequency of the mirror, as a result of which differing patterns can be generated.

But a control unit may also have been provided, with which the mirror can be driven with a sawtooth voltage or with a delta voltage. As a result, the imaging plate can be read uniformly.

Several mirrors may also have been arranged in a mirror array. In this case, differing mirrors may be assigned to differing regions of the imaging plate. For example, with two biaxial mirrors two Lissajous figures or curves arranged side by side can be generated in succession, in order to read larger imaging plates completely.

The imaging plate and the deflection unit may be capable of moving relative to one another, the imaging plate preferentially being conducted past the deflection unit. In this way, large-format imaging plates can be read. In the case where use is made of an only uniaxial mirror, the relative motion is necessary in order to be able to read the imaging plate in two dimensions.

A control unit may have been provided, with which the mirror is capable of being driven in stepwise manner, so that the imaging plate can be read out, pixel by pixel, in a matrix. 'Stepwise' in this connection means that the mirror comes to a state of rest after any change in the position of tilt. This enables the read-out with a constant signal-to-noise ratio.

A maximal read-out range may have been defined, in which the imaging plate is capable of being scanned solely by deflecting the read-out light. Furthermore, the device may include an erasing appliance with which erasing light can be directed onto the imaging plate after the reading of the imaging plate in an erasing region, the erasing region on the imaging plate being at least as large as the read-out region. If the read-out region and the erasing region coincide, the imaging plate can be erased at the same location at which it is read, so that no drive means for conveying in the direction of an erasing appliance are necessary.

According to a further embodiment, the read-out light may deflected by the deflection unit may generate an impingement spot on the imaging plate, and the erasing appliance includes a switching element with which the impingement spot can be enlarged for the purpose of erasing the imaging plate, whereby the read-out light is used as erasing light.

If, for the purpose of erasing the imaging plate, use is made of components that are needed anyway for the purpose of reading, additional components need hardly be incorporated. An enlargement of the impingement spot ("beam footprint") on the imaging plate can be obtained, for example, by means of an actuator for displacing or curving the mirror. But use may also be made, for example, of a displaceable condenser lens on the laser, or of a diffusing screen that is retractable into the beam path.

The erasing appliance may include an intensity-controlling appliance with which, for the purpose of erasing the imaging plate, the intensity of the read-out light can be increased. In this way, the same light-source can be used for erasing that is also utilised for reading, whereby, by virtue of the increase in the intensity, a complete erasure of possibly still excited storage centres is obtained.

Alternatively, the erasing appliance may include a light-source for generating erasing light, the erasing light being directed onto the controllable mirror, so that with the aid of the deflection unit the erasing light can be directed sequentially onto the imaging plate for the purpose of erasing the imaging plate. Special erasing light can also be used in combination with an enlargement of the impingement spot.

In this case a feed element may have been arranged in the beam path upstream of the controllable mirror, with which, simultaneously or alternately, the read-out light and the erasing light can be directed onto the controllable mirror.

The erasing appliance may include several sources of erasing light, in particular light-emitting diodes, which have been arranged around the imaging plate. This is a structurally very simple configuration of an erasing appliance. Preferentially, the sources of erasing light have in this case been arranged in such a way that the erasing light falls onto the entire imaging plate.

The sources of erasing light may have been arranged on a side of the imaging plate from which the read-out light falls onto the imaging plate. In this way, both transparent and non-transparent imaging plates can be erased.

The erasing light may have a broader-band spectrum than the read-out light, as a result of which a higher efficiency of erasure is achieved.

The deflection unit may have been arranged in such a manner that with it the read-out light can be directed onto a front surface of the imaging plate. The detector unit for fluorescent light has in this case been arranged in such a manner that with it the fluorescent light emerging from a rear surface of the imaging plate can be detected. With such an arrangement, transparent imaging plates can be read, whereby, depending on the arrangement, the fluorescent light is able to reach the detector unit directly or indirectly via a reflector.

A supporting plate that is transparent to the fluorescent light may have been provided, against which the imaging plate bears. In this way, the imaging plate can be supported on its rear side, without the fluorescent light emerging there being lost for the measurement. The supporting plate in this case may act as an optical filter that blocks read-out light and lets fluorescent light pass. By reason of the filter action of the supporting plate, only fluorescent light then emerges downstream of the supporting plate.

The supporting plate may have a cylindrically curved supporting surface for the imaging plate. As a result, at least in one read-out direction a perpendicular incidence of the read-out light onto the imaging plate can be ensured. In this case a clamping element may have been provided, with which the imaging plate is pressed against the curved supporting surface. A clamping element co-operating with the supporting surface, such as a clamping bracket for example, is a structurally simple arrangement in order to bring the imaging plate into the cylindrical shape.

The supporting plate may also have been constituted by an entrance window of the detector unit. Given appropriate adaptation of the read-out region, in this way the imaging plate may bear directly against the entrance window of the detector unit and be registered. Particularly in combination with the filter action, a particularly simple structure of the device arises in this way.

The entrance window in this case may be at least as large as the imaging plate to be read, and may, in particular, have the basic shape thereof. As a result, the entire imaging plate can be registered without the latter having to be displaced. The size of the entrance window in this case may be adapted to the customary standard sizes (size 0, 1, 2 etc.) of the imaging plates.

A supporting frame and a clamping element may have been provided, between which the imaging plate is held, said frame and element having been, in particular, configured and arranged in such a manner that a cylindrical curvature is imposed on the imaging plate.

Instead of an uninterrupted supporting plate, only a supporting frame may have been provided, which carries the imaging plate only in marginal regions, in which case both a fully circumferential frame and a frame that is present only intermittently are conceivable. As a result, in the beam path of the fluorescent light there is still less material that could partially absorb or reflect the fluorescent light. The supporting frame may bear against the front side or against the rear side of the imaging plate, in which case the clamping element then undertakes the correspondingly complementary function.

With respect to the method, the aforementioned object is achieved by a method having the following steps:
a) generating read-out light;
b) directing the read-out light on a micromirror;
c) directing the read-out light in a scanning movement over the imaging plate, wherein the micromirror oscillates with a first frequency about a first swivel axis and simultaneously with a second frequency, which is distinct from the first frequency, about a second swivel axis;
d) detecting fluorescent light which is emitted from the imaging plate at locations where the read-out light impinges.

A control unit is able to drive the micromirror about the two swivel axes at frequencies that correspond to a large, preferentially variable, preferentially integral, multiple of a base frequency, in particular to 0.5 times the desired number of lines or the number of columns of the image, and/or that differ slightly from one another by such an integral multiple, in particular by 10% of the lower frequency. As a result, patterns are generated that scan the imaging plate completely. In particular, the sequential scanning of the imaging plate can be effected along a Lissajous figure or curve.

As a result, the micromirror can be driven with a drive signal, the frequency of which may be at least approximately equal to a natural frequency of the micromirror.

The imaging plate may be erased after the scanning, while the imaging plate remains at the location of the scanning. For the purpose of erasing the imaging plate, the intensity of the read-out light can be increased, and then the imaging plate can be scanned with the aid of the deflection unit. For the purpose of erasing the imaging plate, an impingement spot of the read-out light falling onto the imaging plate, or of an erasing light falling onto the imaging plate, can be enlarged.

The imaging plate may, in addition, be brought into a cylindrical shape prior to the scanning.

BRIEF DESCRIPTION OF THE DRAWINGS

The invention will be elucidated below on the basis of embodiments with reference to the drawings. Shown therein are.

DESCRIPTION OF PREFERRED EMBODIMENTS

1. First Group of Embodiments

Figure 1:
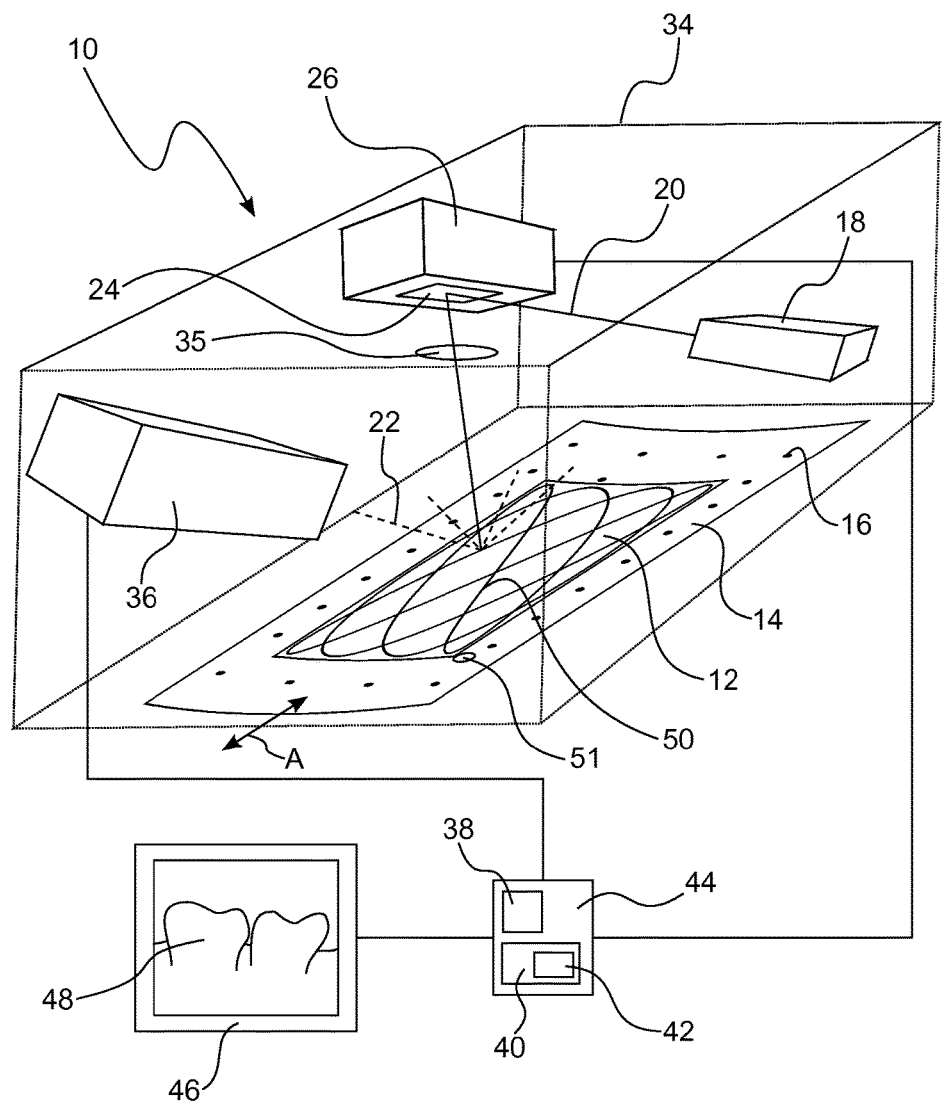
FIG. 1 a simplified perspective representation of a scanner for reading imaging plates in accordance with a first embodiment.

FIG. 1 shows a scanner, denoted overall by 10, for reading an imaging plate 12 which in the form of metastable storage centres excited by X-ray radiation bears a latent X-ray image.

The scanner 10 exhibits a supporting surface 14 for the imaging plate 12. For the purpose of fixing the imaging plate 12, the supporting surface 14 in this case has been provided with a plurality of suction bores 16 which can have a vacuum applied to them via a vacuum source which is not shown, so that the imaging plate 12, which is generally flexible, is able to conform to the supporting surface 14 in flat manner.

The scanner 10 further includes a laser 18 by way of source of read-out light, which generates a read-out light beam 20 having a wavelength in the red spectral region, with which the excited storage centres of the imaging plate 12 can be excited to fluoresce, so that said storage centres emit fluorescent light 22 which is typically in the blue spectral region.

Figure 2:
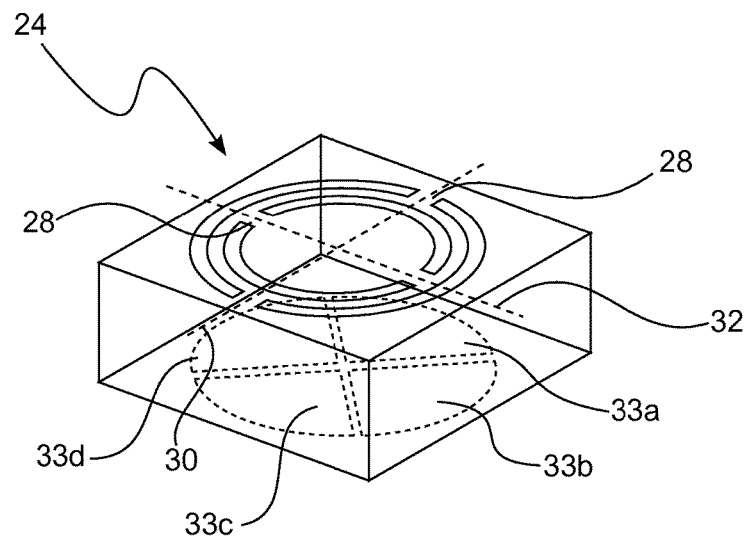
FIG. 2 a perspective representation of a micromirror that is used in the scanner.

The laser 18 has been arranged in such a way that it directs the read-out light beam 20 onto a controllable micromirror 24 which has been arranged on a deflection unit 26. This micromirror 24, which has been constructed as a MEMS component, is shown in FIG. 2. Thanks to its cardanic solid-joint suspension 28, it is capable of swivelling about two axes 30 and 32 and can be swivelled continuously about the two axes 30, 32 with the aid of capacitive actuators 33a, 33b, 33c, 33d acting on its underside and with the aid of assigned control circuits of the deflection unit 26, which are not shown.

In order to obtain, at least in one direction, a perpendicular incidence of the read-out light beam 20 onto the imaging plate 12, the supporting surface 14 in the embodiment shown exhibits a partly cylindrically curved shape which extends parallel to the swivel axis 30 of the micromirror 24. However, the supporting surface may also have been constructed to be completely flat. In addition, an f-theta lens system 35 can be provided as needed, which adapts the angle of incidence of the read-out light beam 20 so as to correspond to the shape of the supporting surface 14.

The laser 18, the supporting surface 14 with the imaging plate 12 and also the deflection unit 26 with the micromirror 24 have been geometrically spaced from one another and arranged relative to one another in the scanner 10 in such a way that with the aid of the micromirror 24 the read-out light beam 20 is able to scan at least the entire surface area of the imaging plate 12. If the scanner 10 enables the reading of variably large imaging plates 12, then, of course, the largest imaging plate 12 predetermines the total surface area to be scanned.

If it is accepted that, for example, marginal regions of the imaging plate 12 are not read, then the various components may, however, also be arranged in such a manner that by swivelling the micromirror 24 only a partial region of the imaging plate can be scanned.

The scanner 10 further includes a reflector 34, indicated in dotted manner in the drawing, which encloses the entire measuring space around the imaging plate 12 in light-tight manner, so that the fluorescent light 22 emanating from the imaging plate 12 is finally reflected to a photodetector 36. In order to prevent scattered read-out light 20 from also reaching the photodetector 36, both the reflector 34 and an input window of the photodetector 36 may have been provided with a dichroic filter material which blocks or absorbs the read-out light 20 and is transparent to the fluorescent light 22.

For the purpose of controlling the read-out process, the scanner 10 includes a control unit 38 and an evaluating unit 40 with a correction memory 42, which here have been shown as parts of integrated instrumental electronics 44, but may also have been implemented as control software on a separate PC. For the purpose of operation, the control unit 38 and the evaluating unit 40 have been connected to a display-and-operating unit 46 with which working parameters can be established and the image 48 which has been read from the imaging plate 12 can be displayed.

The scanner 10 operates as follows:

By swivelling of the micromirror 24 which is controllable about the two swivel axes 30, 32, the imaging plate 12 is scanned sequentially in pointwise manner with the read-out light beam 20. In the process, the intensity of the emitted fluorescent light 22 is registered with the aid of the photodetector 36 and the evaluating unit 40 and is prepared for display.

The control unit 38 drives the micromirror 24 in such a manner that the latter executes oscillations about its two swivel axes 30, 32. As a result of the superposition of the two oscillations, the read-out light beam 20 scans the imaging plate 12 along a Lissajous figure (hereinafter Lissajous curve) 50 by way of scan pattern. By virtue of the two oscillation frequencies and the relationship thereof to one another, the shape of the Lissajous curve 50 is determined, so that other Lissajous curve 50 are generated by other frequencies. In the embodiment shown in FIG. 1 the Lissajous curve 50 exhibits four oscillations in the longitudinal direction and three oscillations in the transverse direction before the scan pattern repeats.

For the purpose of synchronising the evaluating unit 40 with the motion of the read-out light beam 20, one or more photodiodes 51 may have been arranged in the supporting surface 14 alongside the imaging plate 14. When the read-out light beam 20 roams over these photodiodes 51, the location of which is known, the evaluating unit 40 receives corresponding synchronisation signals.

In order to obtain a high read-out efficiency, the micromirror 24 is driven at oscillation frequencies that are close to the natural frequencies about the two axes 30, 32. The natural frequencies in this case are established, inter alia, by the mass of the micromirror 24 and by the angular spring constants of the cardanic solid-joint suspension 28.

Figures 3, 4:
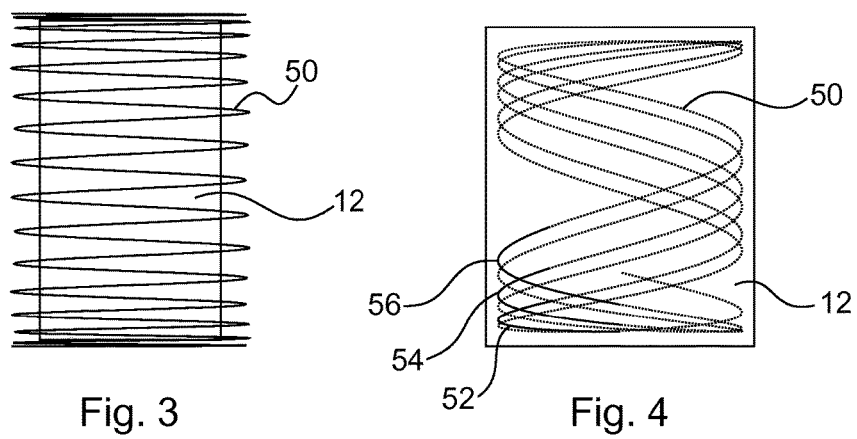
FIG. 3 a top view of an imaging plate that is being read along a scan path according to a first mode.
FIG. 4 a top view of an imaging plate that is being read along a scan path according to another mode.

In order to scan all regions of the imaging plate 12, on the one hand very large frequency ratios, such as 200:1 for example, can now be selected, so that the scanning, as indicated in FIG. 3, corresponds virtually to a line-by-line scanning, in the course of which a slow motion of the read-out light beam 20 occurs along one direction, whereas in the other direction several panning motions follow one another rapidly. In the process, the controllable micromirror 24 can be driven with an oscillation amplitude at which the read-out light beam 20 runs beyond the edges of the imaging plate 12. In this way, the regions of the reversal-points, in which the read-out light beam 20 lingers for a relatively long time, are displaced into regions outside the imaging plate 12, as a result of which an even more uniform scan pattern arises on the imaging plate 12.

However, the frequency ratios of the two oscillations can also easily be detuned in relation to one another, for example in a ratio 3:4.05, so that the lines of the Lissajous curve 50 are easily displaced upon each sweep of the figure and in this way a moving Lissajous curve 50 is generated which gradually scans all regions of the imaging plate 12. This procedure is indicated in FIG. 4, in which the initial regions of the first, second and third sweeps of the Lissajous curve 50 have been indicated respectively by 52, 54 and 56.

Since with this method the imaging plate 12 is scanned repeatedly at many points, for example at the points of intersection of the Lissajous curve 50, and, in the process, excited storage centres possibly still remaining additionally emit fluorescent light 22, the evaluating unit 40 has to take this into account appropriately in the course of evaluating the photodetector signal and in the course of building up the image.

To this end, for the purpose of calibration a completely uniformly exposed imaging plate 12 may be used which is scanned with the Lissajous curve 50 provided for the purpose of read-out. In the process, the signals received from the photodetector 36 are added up, whereby, by reason of the multiple scanning of the points of intersection, brighter summed intensities arise in the image 48 at these points. The calibration image 48 obtained in this way is converted into correction values which are saved in the correction memory 42 of the evaluating unit 40. If subsequently an imaging plate 12 is read that contains actual image information, the ascertained intensities are corrected so as to correspond to the correction values contained in the correction memory 42.

For calibration purposes, mathematical methods are also conceivable in which the scanning path of the Lissajous curve 50 is modelled and taken into account appropriately in the course of the summation of the photodetector signal. Also in this way, the effects of the multiple scanning or of the variable speeds of motion along the scan pattern can be compensated, and correction values can be ascertained which are saved in the correction memory 42. However, with these purely mathematical methods special properties of the plate, for example what percentage of the excited storage centres still remains after a first read-out process, can only be taken into account if the type of imaging plate is specified by the operator or by an automatic recognition system.

Figure 5:
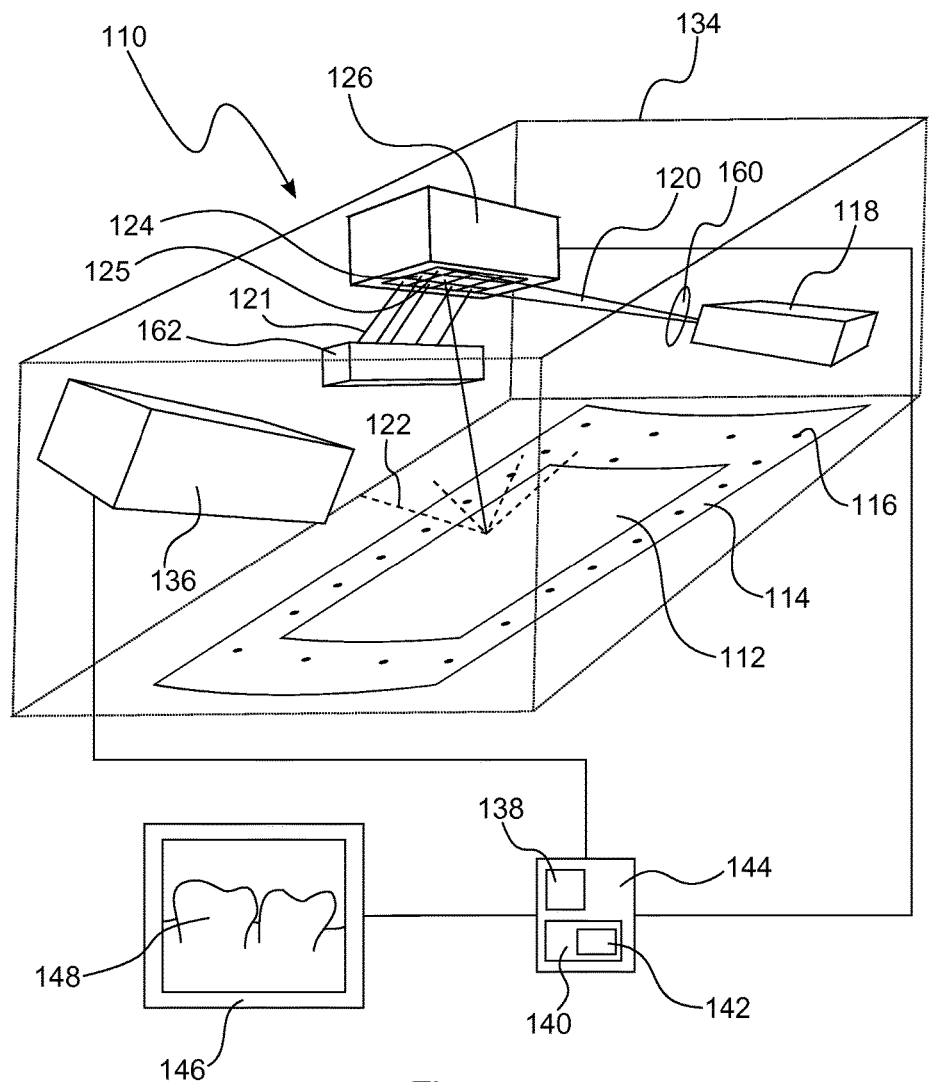
FIG. 5 a simplified perspective representation of a scanner according to another embodiment.

FIG. 5 shows a scanner 110 according to another embodiment, wherein structurally similar components bear reference symbols increased by 100.

In the embodiment shown in FIG. 5, instead of the micromirror 24 a micromirror array 124 has been provided on the deflection unit 126, in which the individual micromirrors 125 can be switched in binary manner between two positions of tilt. Micromirror arrays 124 of such a type are used in the field of consumer electronics in DLP projectors for generating projected images and are available on the market in large numbers at favourable cost.

In order to illuminate the entire micromirror array 124, the read-out light beam 120 emanating from the laser 118 is expanded via an expanding lens system 160. By switching the individual micromirrors 125, component beams 121 of the read-out light beam 120 can then be directed either onto the imaging plate 112 or onto a beam absorber 162 which absorbs the component beams 121. For this purpose the beam absorber 162 may have been constructed to be strongly absorbing.

The scanner 110 operates in such a way that in each instance only one of the micromirrors 125 of the micromirror array 124 has been set to "ON", i.e. the associated component beam 121 thereof has been directed onto a point assigned to it on the imaging plate 112. All other micromirrors 125 have at this time been set to "OFF", i.e. the component beams 121 thereof are directed onto the beam absorber 162. In this way, the imaging plate 112 can be scanned, point by point, by pointwise switching of the micromirrors 125 on and off.

In a modification, the micromirror 24 may be capable of being swivelled about only one swivel axis 30. In this case the supporting surface 14 can, as indicated in FIG. 1 by the double-headed arrow A, be moved along one direction, preferentially axially along the cylindrical shape of the supporting surface 14, in order to move the imaging plate 12 past the read-out line constituted by the swivelling read-out light beam 20. But the supporting surface 14 can also be moved in the case where use is made of the biaxial micromirror 24 if particularly large-area imaging plates 12 have to be read.

In a further modification, the micromirror 24 may also be driven in stepwise manner, so that the micromirror 24 can remain in individual intermediate positions of tilt, allowing a read-out, pixel by pixel, in a matrix. As a result, the read-out beam is able to dwell at each point of the imaging plate 12 for a desired read-out time, whereby each point can then also be read out for an equally long time. This has the result that each point of the registered image exhibits the same signal-to-noise ratio.

2. Second Group of Embodiments

FIGS. 6 to 9 show embodiments with alternative arrangements of the detector unit, and various options for erasing the imaging plate after the latter has been read. Structurally similar components in these cases bear reference symbols increased respectively by 200, 300, 400 and 500 with respect to those used in FIG. 1. In order to simplify FIGS. 6 to 9, the instrumental electronics 44 have not been shown in these Figures.

Figure 6:
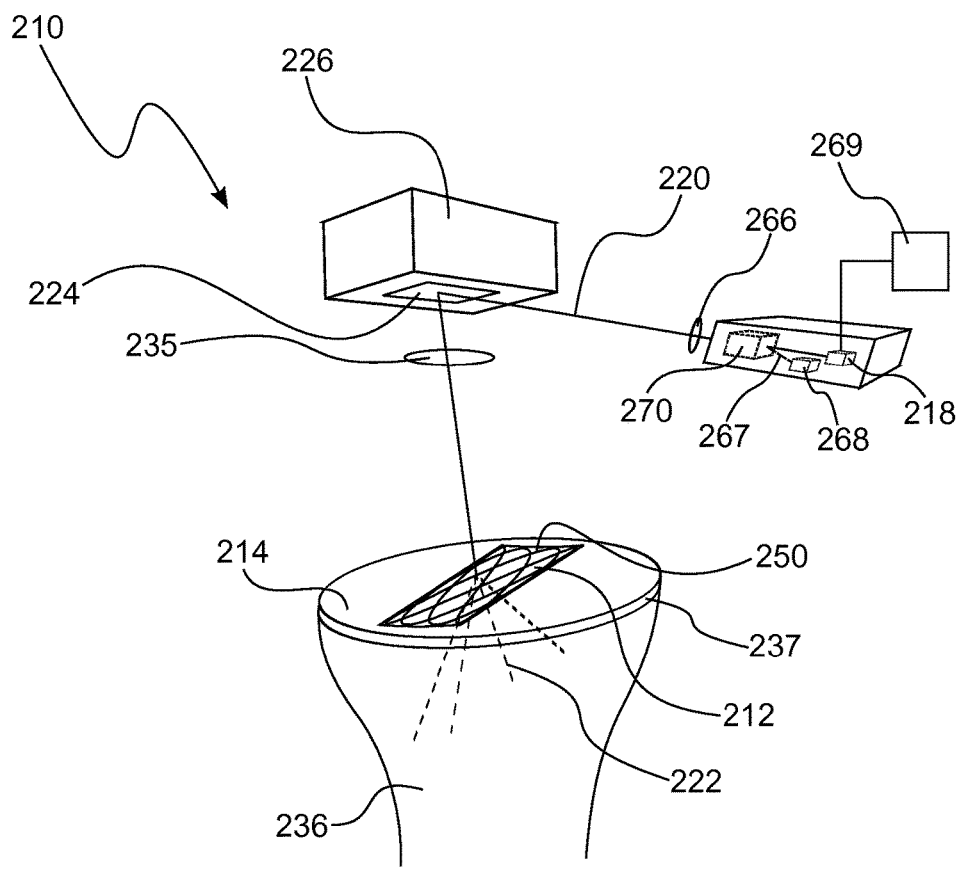
FIG. 6 a simplified perspective representation of a scanner for transparent imaging plates.

FIG. 6 shows a scanner 210 with which an imaging plate 212 that is transparent to fluorescent light can be read.

The scanner 210 includes for this purpose a photodetector 236, the entrance window of which is constituted by a filter plate 237 which blocks the read-out light 220 but lets the fluorescent light 222 pass. The photodetector 236 has furthermore been arranged in such a way that the surface of the filter plate 237 pointing outwards serves at the same time as supporting surface 214, against which the imaging plate 212 bears. The imaging plate 212 is consequently arranged directly in front of the entrance window of the photodetector 236.

During the read-out process the read-out light 220 impinges from one side onto the imaging plate 212. The fluorescent light 222 released in the process then emerges on the other side of the imaging plate 212, in order to get from there through the filter plate 237 and into the photodetector 236 and to generate a signal therein. The filter action of the filter plate 237 prevents the read-out light 220 from also generating a signal in the photodetector 236.

In order to erase an imaging plate 212 completely that has already been read, in the case of the scanner 210 a displaceable condenser lens 266, an erasing-light source 268 and a feed element 270 have been provided by way of erasing appliance. With the feed element 270 both the read-out light 220 of the laser 218 and the erasing light 267 of the erasing-light source 268 feed into the beam path that leads to the deflection unit 226.

For the purpose of erasing the imaging plate 212, the condenser lens 266 is displaced in such a way that the impingement spot of the read-out light 220 or of the erasing light 267 on the imaging plate 212 is enlarged. After this, the imaging plate 212 is scanned until such time as a sufficiently complete erasure of excited storage centres still remaining can be assumed.

The use of broader-band erasing light 267 is not absolutely essential in this case. Accordingly, under certain circumstances it may suffice to increase the intensity of the read-out light 220 emitted by the laser 218 with the aid of the intensity-controlling unit 269, and to carry out the erasure with this read-out light. In this case the erasing-light source 268 and the feed element 270 can be dispensed with.

Figure 7:
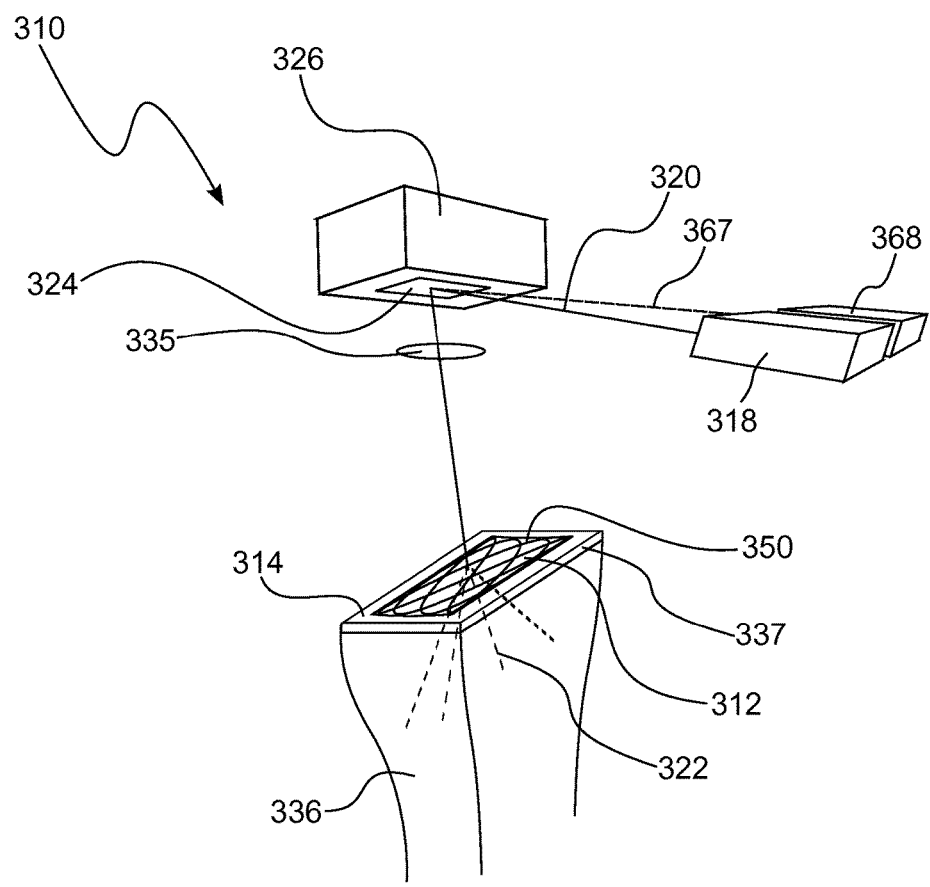
FIG. 7 a simplified perspective representation of a scanner for transparent imaging plates according to an embodiment in which another erasing appliance and another detector unit are used.

FIG. 7 shows a scanner 310 in which a separate erasing-light source 368 has likewise been provided. However, the light of the erasing-light source 368 is not fed into the same beam path as the read-out light 320 but is directed onto the micromirror 324 of the deflection unit 326 at an angle differing from that of the read-out light 320.

For the purpose of erasure, the micromirror 324 is then driven by the control unit 338, taking a corresponding offset angle into account, in such a way that the erasing light 367 falling onto the micromirror 324 from a direction differing from that of the read-out light 320 is nevertheless directed onto the imaging plate 312.

Furthermore, the scanner 310 exhibits a detector unit 336 which exhibits a rectangular entrance window, the size and shape of which correspond roughly to those of the imaging plate 312.

Figure 8:
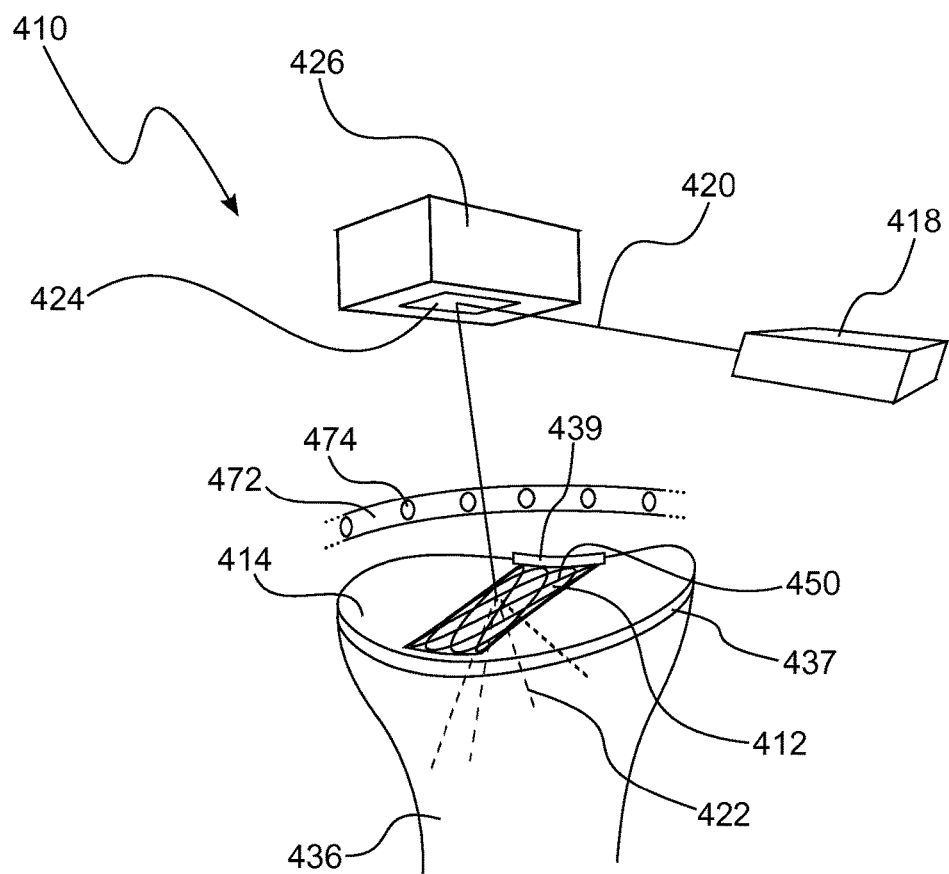
FIG. 8 a simplified perspective representation of a scanner for transparent imaging plates according to a further embodiment with modified erasing appliance.

The embodiment shown in FIG. 8 shows a scanner 410 in which the filter plate 437 exhibits a cylindrically curved supporting surface 414 onto which the imaging plate 412 is placed with the aid of a clamping element 439. The radius of curvature of the supporting surface 414 corresponds in this case to the spacing thereof from the micromirror 424, so that in the transverse direction relative to the cylinder axis the read-out light 420 always falls perpendicularly onto the imaging plate 412, regardless of the deflection angle.

In the axial direction of the supporting surface 414 a perpendicular incidence on the imaging plate 412 can be generated via an f-theta lens system acting uniaxially. However, if a deterioration of the read-out quality in the axial direction, occurring by virtue of variable oblique incidence, is accepted, then an f-theta lens system can be dispensed with completely.

For the purpose of erasing the imaging plate 412 completely, in this embodiment an LED strip 472 with erasing-light LEDs 474 has been provided by way of erasing appliance, which has been arranged circumferentially above the filter plate 437 in such a way that the uniformly spaced erasing-light LEDs 474 are able to direct their erasing light 467 onto the imaging plate 412.

Figure 9:
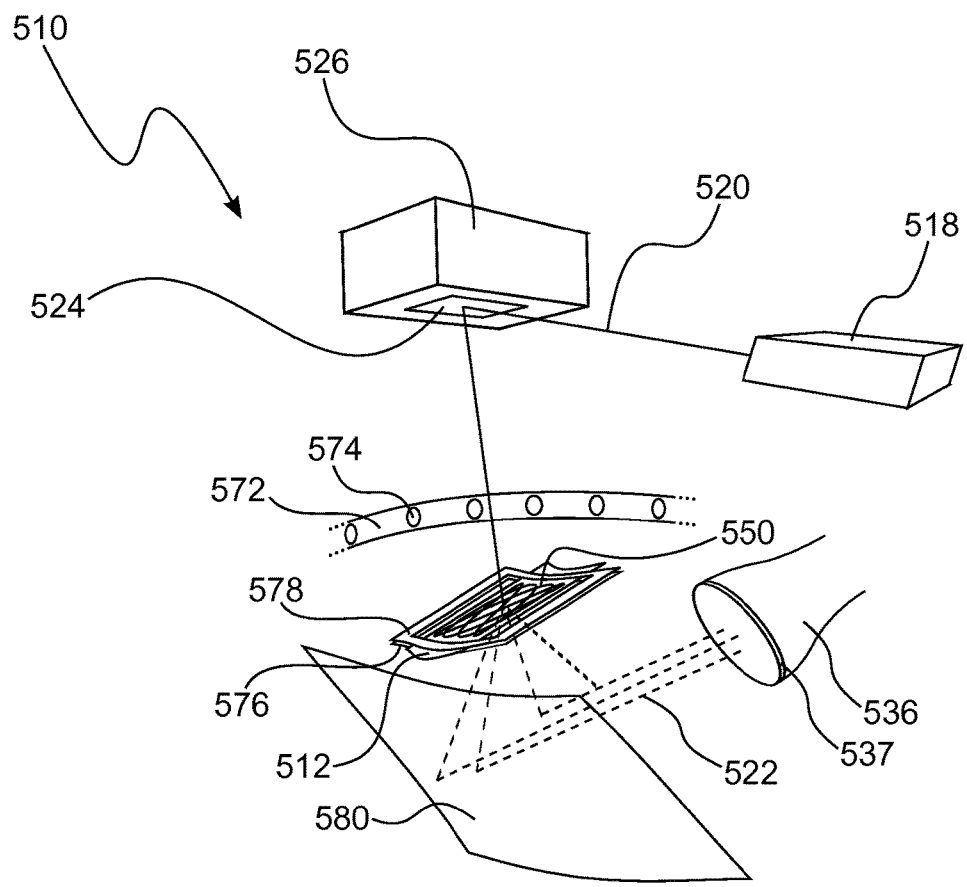
FIG. 9 a simplified perspective representation of a scanner for transparent imaging plates according to an embodiment in which the imaging plate is carried by a supporting frame.

Finally, FIG. 9 shows an embodiment of a scanner 510 in which a cylindrically curved supporting frame 576 has been provided for a transparent imaging plate 512. A clamping frame 578 co-operates with the supporting frame 576, so that the imaging plate 512 introduced between the supporting frame 576 and the clamping frame 578 is kept cylindrically curved.

In order to keep the scanner 510 as compact as possible, the latter further includes a reflector mirror 580 which here has been constructed in curved manner and which has been arranged with respect to the supporting frame 576 on the side situated opposite the micromirror 524. The reflecting mirror 580 and the photodetector 536 have furthermore been arranged relative to one another in such a way that fluorescent light 522 emerging on the imaging plate 512 from the reverse side thereof falls onto the entrance window of the photodetector 536 after reflection on the reflector mirror 580. By reason of the reflector mirror 580, the position of the photodetector 536 can be chosen more freely, enabling a more compact structural shape of the scanner 510. In addition, a photodetector 536 with a smaller entrance window can be used if the reflector mirror 580 has a focusing action.

The invention claimed is:

1. A device configured to read an exposed imaging plate, comprising
a light-source configured to generate read-out light,
a deflection unit configured to direct the read-out light in a scanning movement over the imaging plate, wherein the deflection unit comprises a micromirror configured to deflect impinging read-out light towards the imaging plate, and wherein the micromirror is configured to swivel about a first swivel axis and about a second swivel axis that is distinct from the first swivel axis,
a control unit that is configured to generate periodic pulses which excite the micromirror such that it oscillates with a first frequency about the first swivel axis and simultaneously with a second frequency, which is distinct from the first frequency, about the second swivel axis,
a detector unit configured to detect fluorescent light which is emitted from the imaging plate at locations where the read-out light impinges.

2. The device of claim 1, wherein the micromirror is capable of continuously swivelling about the first swivel axis between two first end positions, and of continuously swivelling about the second swivel axis between two second end positions.

3. The device of claim 1, wherein the first frequency is at least 250 times as large as the second frequency.

4. The device of claim 1, wherein the control unit is configured to control the micromirror such that the read-out light follows a Lissajous figure on the imaging plate.

5. The device of claim 4, wherein the Lissajous figure is determined such that the imaging plate is completely scanned.

6. The device of claim 1, comprising an evaluating unit that communicates with the detector unit and is configured to determine intensities of X-rays that contributed to an exposure of points on the imaging plate, wherein the evaluating unit is configured to take into account the fact that points on the imaging plate are subjected to the read-out light for different times while the micromirror oscillates about the first and the second swivel axis.

7. The device of claim 6, wherein the evaluating unit is configured to take into account the fact that points on the imaging plate are subjected to the read-out light for different times while the micromirror oscillates about the first and the second swivel axis, by using a position dependent correction factor.

8. The device of claim 1, comprising a sync detector which is configured to detect read-out light at a predetermined location.

9. The device of claim 1, wherein the control unit is configured to control the micromirror such that reversal-points of oscillations of the read-out light are arranged outside the imaging plate.

10. The device of claim 1, comprising an erasing appliance configured to direct erasing light onto the imaging plate after the reading of the imaging plate in an erasing region, wherein the erasing appliance comprises a switching element, which is configured to enlarge a spot that is produced by the read-out light on the imaging plate, and an intensity-controlling appliance configured to increase an intensity of the read-out light for the purpose of erasing the imaging plate.

11. The device of claim 1, comprising an erasing appliance configured to direct erasing light onto the imaging plate after the reading of the imaging plate in an erasing region, wherein the erasing appliance comprises a plurality of erasing-light sources that are arranged around the imaging plate.

12. The device of claim 1, comprising a supporting plate that is transparent to the fluorescent light and against which the imaging plate bears.

13. The device of claim 12, wherein the supporting plate acts as an optical filter which blocks the read-out light and lets fluorescent light pass.

14. The device of claim 12, wherein the supporting plate forms an entrance window of the detector unit.

15. A method of reading an imaging plate, comprising the following steps:
   a) generating read-out light;
   b) directing the read-out light on a micromirror;
   c) directing the read-out light in a scanning movement over the imaging plate, wherein the micromirror is excited with periodic pulses so that it oscillates with a first frequency about a first swivel axis and simultaneously with a second frequency, which is distinct from the first frequency, about a second swivel axis;
   d) detecting fluorescent light which is emitted from the imaging plate at locations where the read-out light impinges.

16. The method of claim 15, wherein the first frequency is at least 250 times as large as the second frequency.

17. The method of claim 15, wherein the control unit is configured to control the micromirror such that reversal-points of oscillations of the read-out light are arranged outside the imaging plate.

18. The device of claim 15, wherein the imaging plate has a pair of long sides and a pair of shorter sides, and wherein the reversal points are arranged adjacent to, but outside, the long sides of the imaging plate.

19. The method of claim 17, wherein a portion of a pattern, along which the read-out light follows during the scan movement, extends beyond an edge of the imaging plate by a length that is between 5% and 15% of a length of the imaging plate perpendicular to this edge.

20. The method of claim 15, wherein, during step d), the read-out light impinges also on a synch detector arranged outside the imaging plate, wherein the synch detector detects the read-out light for the purpose of synchronising an evaluating unit with the scanning movement motion of the read-out light.

21. The method of claim 15, wherein the imaging plate is erased with erasing light while the imaging plate remains at a location where it is or has been scanned.

22. The method of claim 21, wherein read-out light having an increased intensity is used as the erasing light, and wherein the erasing light is directed on the imaging plate in a scanning movement using the micromirror.

23. The method of claim 15, wherein the read-out light follows a Lissajous figure on the imaging plate.

24. A device configured to read an exposed imaging plate, comprising
   a light-source configured to generate read-out light,
   a micromirror configured to deflect impinging read-out light towards the imaging plate, wherein the micromirror is configured to oscillate about a swivel axis,
   a control unit that is configured to generate periodic pulses which excite the micromirror such that reversal-points of oscillations of the read-out light are arranged outside the imaging plate,
   a detector unit configured to detect fluorescent light which is emitted from the imaging plate at locations where the read-out light impinges.

25. The device of claim 1, wherein the control unit is configured to vary at least one of the group consisting of: a width of the pulses, a shape of the pulses, and a height of the pulses.

26. The method of claim 15, wherein the pulses are varied by changing at least one of the group consisting of: a width of the pulses, a shape of the pulses, and a height of the pulses.

* * * * *